(12) United States Patent
Takebayashi et al.

(10) Patent No.: US 10,315,314 B2
(45) Date of Patent: Jun. 11, 2019

(54) END EFFECTOR, INDUSTRIAL ROBOT, AND OPERATION METHOD THEREOF

(71) Applicant: KAWASAKI JUKOGYO KABUSHIKI KAISHA, Kobe-shi, Hyogo (JP)

(72) Inventors: Jun Takebayashi, Kakogawa (JP); Shuhei Kuraoka, Akashi (JP); Hiroyuki Mizumoto, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 15/507,576

(22) PCT Filed: Aug. 13, 2015

(86) PCT No.: PCT/JP2015/072890
§ 371 (c)(1),
(2) Date: Feb. 28, 2017

(87) PCT Pub. No.: WO2016/031582
PCT Pub. Date: Mar. 3, 2016

(65) Prior Publication Data
US 2017/0305017 A1    Oct. 26, 2017

(30) Foreign Application Priority Data
Aug. 29, 2014   (JP) .................. 2014-176215

(51) Int. Cl.
*B23P 19/08* (2006.01)
*B25J 15/04* (2006.01)
(Continued)

(52) U.S. Cl.
CPC ............. *B25J 15/04* (2013.01); *B23P 19/084* (2013.01); *B25J 15/0052* (2013.01);
(Continued)

(58) Field of Classification Search
CPC ........ B25J 15/04; B25J 15/08; B25J 15/0408; B25J 15/0052; B25J 15/10; B23P 19/084
See application file for complete search history.

(56) References Cited

U.S. PATENT DOCUMENTS 3,306,646 A * 2/1967 Flora, Jr. ................. B66C 1/427
                                                        294/106
4,768,428 A * 9/1988 Silvestrini ................ A23N 4/04
                                                        294/106
(Continued)

FOREIGN PATENT DOCUMENTS

FR      2561964 A1    10/1985
JP      S57-48447 A    3/1982
(Continued)

OTHER PUBLICATIONS

Nov. 2, 2015 Search Report issued in International Patent Application No. PCT/JP2015/072890.
(Continued)

*Primary Examiner* — Stephen A Vu
(74) *Attorney, Agent, or Firm* — Oliff PLC

(57) ABSTRACT

An end effector has an end effector base portion connected to a robot arm, and an elastic component holding unit provided to the end effector base portion so as to hold an elastic component. The elastic component holding unit has a plurality of elastic component gripping members which releasably grip the elastic component, and a biasing unit for repulsively biasing each distal end portion of the plurality of elastic component gripping members from a releasing position for releasing the elastic component toward a gripping position for gripping the elastic component. An end effector capable of simplifying a fitting work of an elastic component such as the O ring can be provided.

14 Claims, 12 Drawing Sheets

(51) Int. Cl.
*B25J 15/08* (2006.01)
*B25J 15/00* (2006.01)
*B25J 15/10* (2006.01)

(52) U.S. Cl.
CPC .......... *B25J 15/0408* (2013.01); *B25J 15/08* (2013.01); *B25J 15/10* (2013.01)

(56) References Cited

U.S. PATENT DOCUMENTS

| | | | |
|---|---|---|---|
| 5,127,692 A | 7/1992 | Yakou et al. | |
| 5,280,981 A * | 1/1994 | Schulz | B25J 15/103 294/106 |
| 7,370,896 B2 * | 5/2008 | Anderson | B25J 15/0009 294/106 |
| 8,684,432 B2 * | 4/2014 | Saka | B25J 15/08 294/119.1 |
| 2011/0089709 A1 * | 4/2011 | Neeper | B25J 9/102 294/119.1 |

FOREIGN PATENT DOCUMENTS

| | | |
|---|---|---|
| JP | S58-126087 A | 7/1983 |
| JP | S58-154088 U | 10/1983 |
| JP | S60-190535 U | 12/1985 |
| JP | S64-23330 U | 2/1989 |
| JP | H01-64331 U | 4/1989 |
| JP | H05-69363 A | 3/1993 |
| JP | H0947922 A | 2/1997 |
| JP | 2011-177862 A | 9/2011 |
| JP | 2013-091121 A | 5/2013 |
| JP | 2013-192365 A | 9/2013 |

OTHER PUBLICATIONS

Apr. 10, 2018 Extended European Search Report issued in European Patent Application No. 15835983.6.

* cited by examiner

END EFFECTOR, INDUSTRIAL ROBOT, AND OPERATION METHOD THEREOF

TECHNICAL FIELD

The present invention relates to an end effector, particularly an end effector used for assembling components, to an industrial robot comprising the end effector, and to an operation method of the industrial robot.

BACKGROUND ART

In an industrial robot, a suitable end effector (hand) corresponding to its work contents is mounted to a distal end of a robot arm, and an object to be handled which is held by the end effector is transferred by driving the robot arm. In a production line for completing a product by assembling various kinds of objects to be handled (components) with different forms and dimensions, an industrial robot capable of dealing with multiple kinds of objects to be handled is needed.

If dedicated robots are arranged for each kind of object to be handled, space needed to install the robots increases and cost for manufacturing the robots also increases. Therefore, there is a request that a single robot can deal with different work contents and objects to be handled.

Thus, industrial robots are proposed, wherein a hand mounted to a distal end of a robot arm can be automatically exchanged as a whole according to work contents, or wherein the configuration of the hand mounted to the distal end of the robot arm can be partially changed according to forms and dimensions of objects to be handled (Patent Documents 1, 2).

CITATION LIST

Patent Documents

[Patent Document 1] Japanese Patent Application Laid-Open No. 2013-192365
[Patent Document 2] Japanese Patent Application Laid-Open No. 2011-177862

SUMMARY OF INVENTION

Objects to be Achieved by the Invention

However, the industrial robot wherein the configuration of the hand mounted to the distal end of the robot arm can be changed according to kinds and sizes of objects to be handled requires a complicated configuration since the configuration of the hand is changed, thus increasing space for installing hands to be exchanged, declining credibility due to the complicated configuration, and also increasing the cost.

This problem becomes serious particularly when automating a work for fitting a O ring into a O ring mounting groove of an assembly component by a robot. Specifically, in order to fit an O ring into an O ring mounting groove of an assembly component, it is needed to first make the O ring in its slightly-stretched state from its natural state and to fit the O ring into the O ring mounting groove utilizing a contraction force of the O ring from this extended state. Therefore, the configuration of the hand needed for the work becomes complicated and the work contents also becomes complicated.

This becomes a problem when fitting not only the O ring but also an annular or C-shaped component having elasticity such as an oil seal and a snap ring by a robot.

Additionally, the complication of a fitting work of an elastic component such as the O ring is not necessarily limited to the fitting work by a robot having an exchangeable hand and a configuration changeable hand.

The present invention is made considering the above-mentioned problems of the conventional technologies, and its object is to provide an end effector capable of simplifying the fitting work of an elastic component such as the O ring by a robot, an industrial robot comprising the end effector, and an operation method of the industrial robot.

Means for Achieving the Objects

In order to achieve the objects above, a first aspect of the present invention is an end effector mounted to a robot arm, comprising: an end effector base portion connected to the robot arm; and an elastic component holding unit provided to the end effector base portion so as to hold an elastic component, wherein the elastic component holding unit has a plurality of elastic component gripping members which releasably grip the elastic component; and a biasing unit for repulsively biasing each distal end portion of the plurality of elastic component gripping members from a releasing position for releasing the elastic component toward a gripping position for gripping the elastic component.

A second aspect of the present invention is that, in the first aspect, an object holding unit provided to the end effector base portion so as to hold an object to be handled; and a holding mechanism provided to the end effector base portion so as to releasably hold the elastic component holding unit are further provided.

A third aspect of the present invention is that, in the second aspect, the elastic component holding unit held by the holding mechanism is driven by the object holding unit.

A fourth aspect of the present invention is that, in the third aspect, the object holding unit has an object gripping member for gripping the object to be handled, and the elastic component holding unit held by the holding mechanism is driven by the object gripping member.

A fifth aspect of the present invention is that, in the fourth aspect, the elastic component gripping member of the elastic component holding unit held by the holding mechanism is driven by the object gripping member.

A sixth aspect of the present invention is that, in the fifth aspect, the elastic component gripping member is driven by the object gripping member against a biasing force of the biasing unit in a direction that the elastic component is released.

A seventh aspect of the present invention is that, in any one of the first to sixth aspects, the holding mechanism is provided in a center portion of the end effector base portion, and the object holding unit is provided in a periphery of the holding mechanism.

An eighth aspect of the present invention is that, in any one of the first to seventh aspects, distal end portions of the plurality of elastic component gripping members lower along an outer surface of a tapered part of an object to which the elastic component is fitted while being displaced from the gripping position toward the releasing position against a repulsive force of the biasing unit.

A ninth aspect of the present invention is that, in any one of the first to eighth aspects, the elastic component gripping member has an elongated swinging member which is swingably provided to the end effector base portion, and distal end portions of the plurality of elongated swinging members grip the elastic component.

A tenth aspect of the present invention is that, in any one of the first to ninth aspects, the each distal end portion of the plurality of elastic component gripping members in the gripping position has a part positioned inner side than an outer peripheral edge of the elastic component which is gripped.

An eleventh aspect of the present invention is that, in any one of the first to tenth aspects, the elastic component is an annular or C-shaped component having elasticity.

An industrial robot according to a twelfth aspect of the present invention comprises the end effector according to any one of the first to eleventh aspects; and a robot arm to which the end effector is mounted.

A thirteenth aspect of the present invention is an operation method of the industrial robot according to the twelfth aspect, comprising: a transfer step in which the robot arm is driven so as to transfer the elastic component which is held by the elastic component holding unit; a fitting step in which the elastic component holding unit is driven so that the elastic component which has been held by the elastic component holding unit is released and fitted to a guide jig; and a pressing down step in which the elastic component is pressed down along an outer surface of the guide jig by distal end portions of the plurality of elastic component gripping members of the elastic component holding unit.

A fourteenth aspect of the present invention is that, in the thirteenth aspect, in the fitting step, the elastic component is fitted to a tapered part of the guide jig, and, in the pressing down step, the distal end portions of the plurality of elastic component gripping members lower along an outer surface of the tapered part of the guide jig while being displaced from the gripping position toward the releasing position against a repulsive force of the biasing unit.

A fifteenth aspect of the present invention is that, in the thirteenth or fourteenth aspect, the elastic component is an annular or c-shaped component having elasticity.

Effect of the Invention

According to the present invention, a fitting work of an elastic component such as the O ring using a robot can be simplified.

EMBODIMENT OF THE INVENTION

Figure 1:
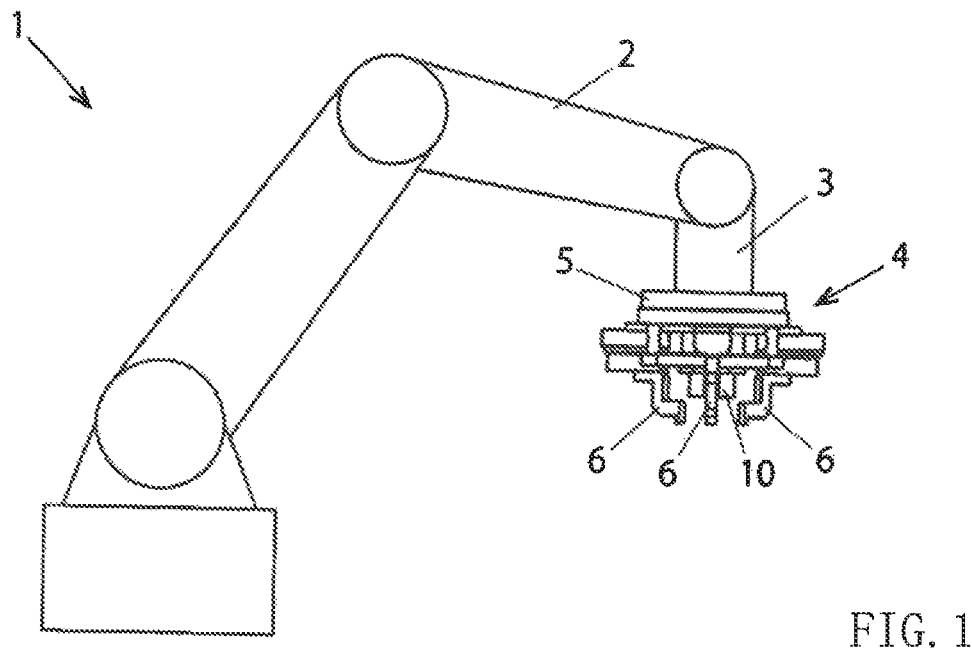
FIG. 1 is a side view illustrating a schematic configuration of an industrial robot to which an end effector according to one embodiment of the present invention is mounted (in a state that a second object holding unit is removed).

Hereunder, an end effector 4 of an industrial robot 1 according to one embodiment of the present invention will be described referring to the drawings.

As illustrated in FIG. 1, the industrial robot 1 of this embodiment has an articulated robot arm 2 and the end effector (hand) 4 mounted to a wrist shaft 3 on a distal end of the robot arm.

Note that kinds of industrial robots to which the present invention is applied are not particularly limited and the present invention can be applied to various kinds of industrial robots such as a vertical articulated robot, a horizontal articulated robot, or the like.

Figure 2:
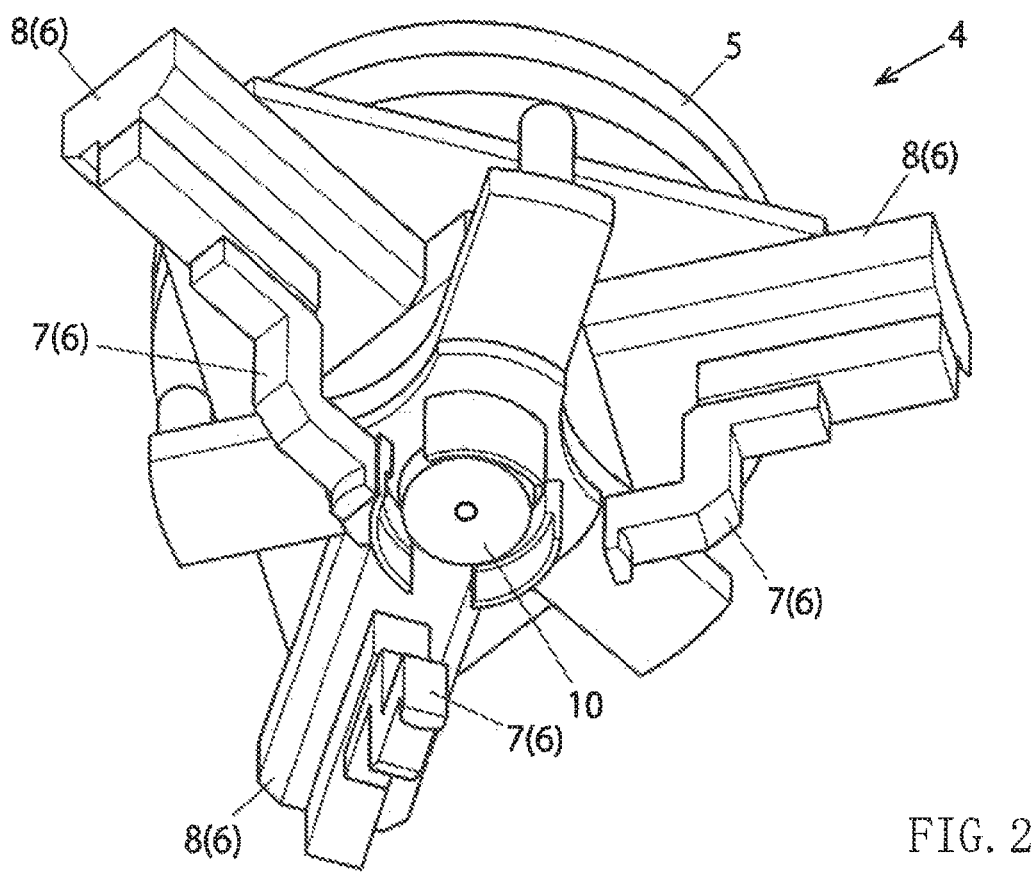
FIG. 2 is a perspective view from diagonally below illustrating the end effector of the industrial robot in FIG. 1 in a state that the second object holding unit is removed.
Figure 3:
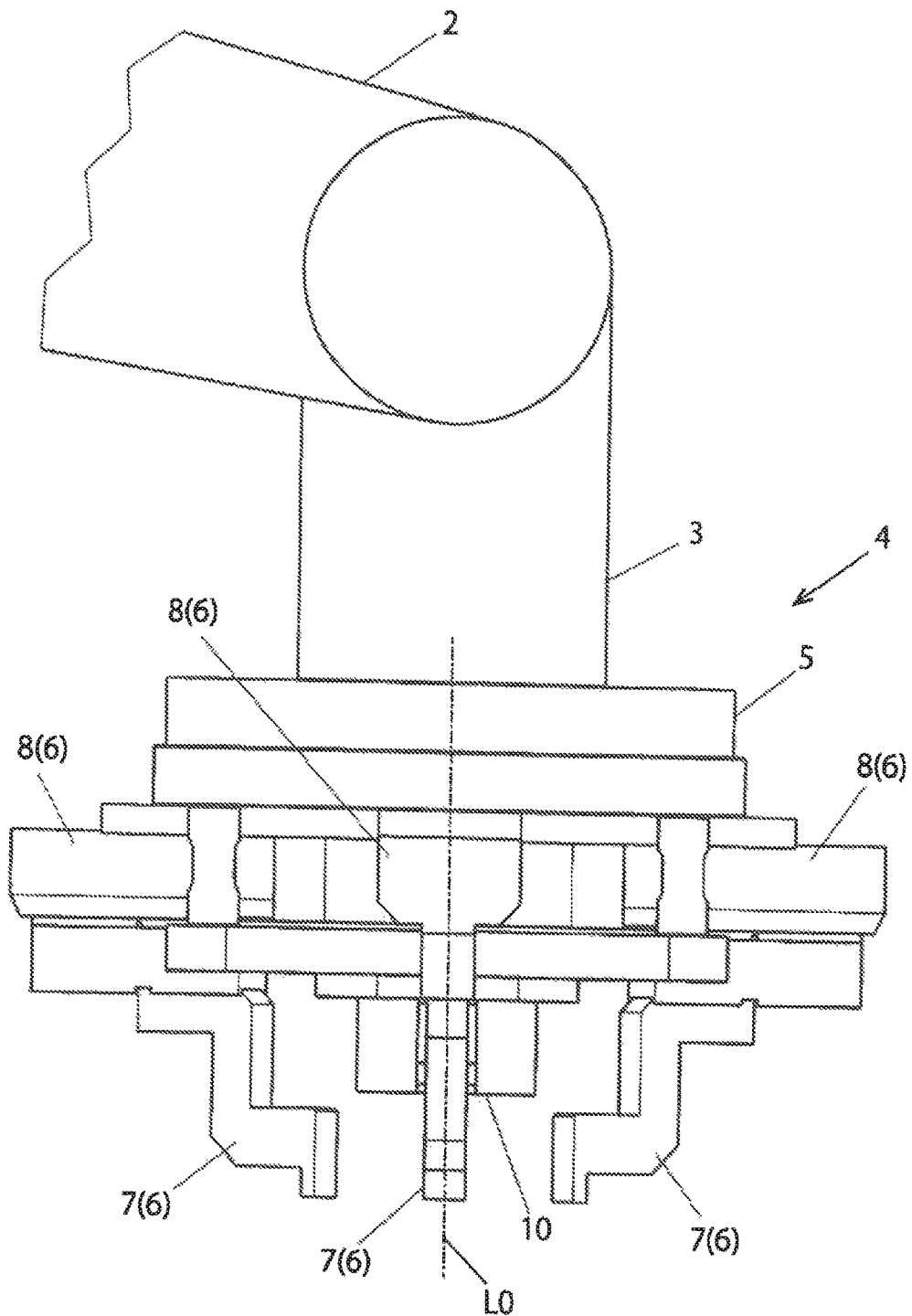
FIG. 3 is a front view of the end effector in FIG. 2.
Figure 4:
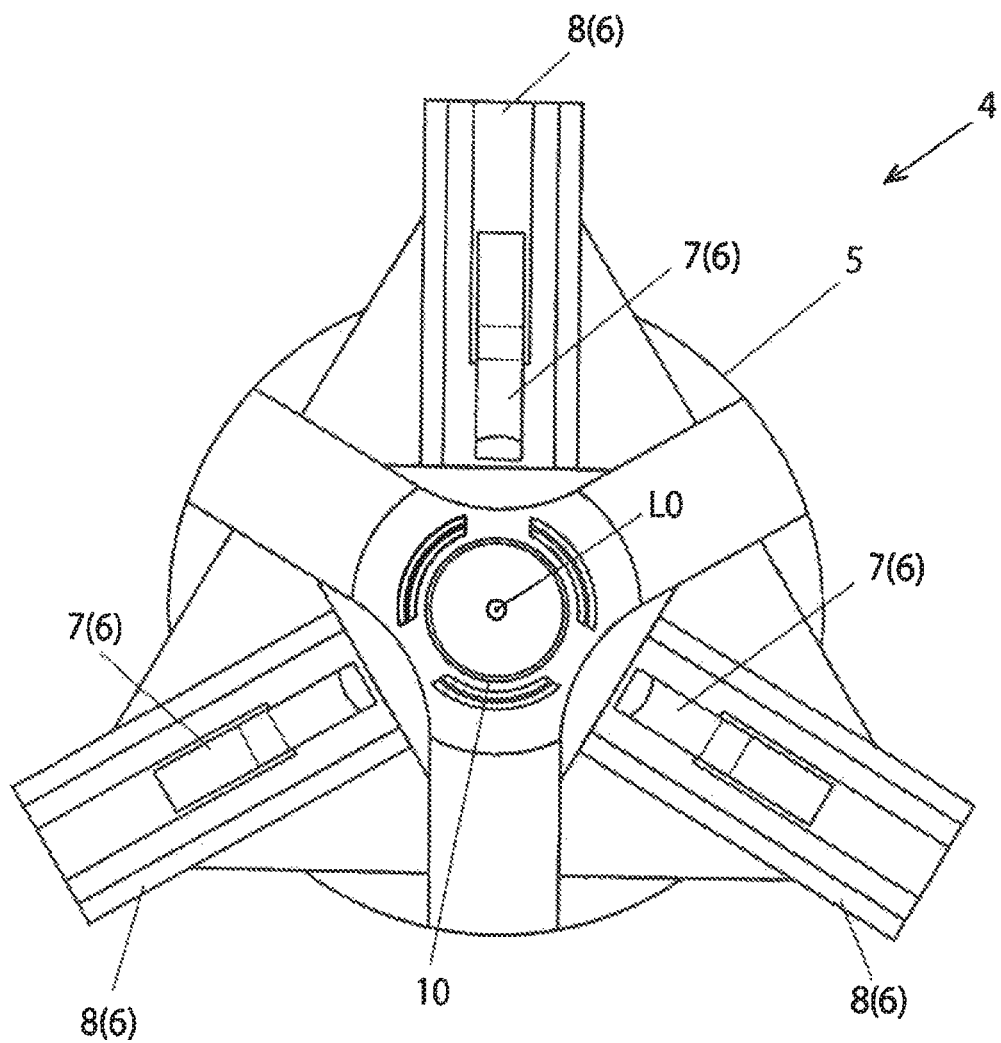
FIG. 4 is a bottom view of the end effector in FIG. 2.

As illustrated in FIGS. 2 to 4, the end effector 4 in this embodiment comprises an end effector base portion 5 connected to the robot arm 2 (FIG. 1). The end effector base portion 5 is provided with a first object holding mechanism 6 for holding a first type of object to be handled.

The first object holding mechanism 6 has a plurality of first gripping members (object griping members) 7 for gripping the first type of object to be handled, and a gripping member drive unit 8 for driving these first gripping members 7.

In this embodiment, three first gripping members 7 are arranged at equal angular intervals (120°) around a center axis L0 of the end effector 4. Each of the first gripping members 7 is driven back and forth in a radial direction with respect to the center axis L0 of the end effector 4 by the gripping member drive unit 8.

A type of the gripping member drive unit 8 is not particularly limited, and various drive sources such as a fluid pressure cylinder such as an air cylinder or an electric drive source such as a servo motor can be used.

Figure 5:
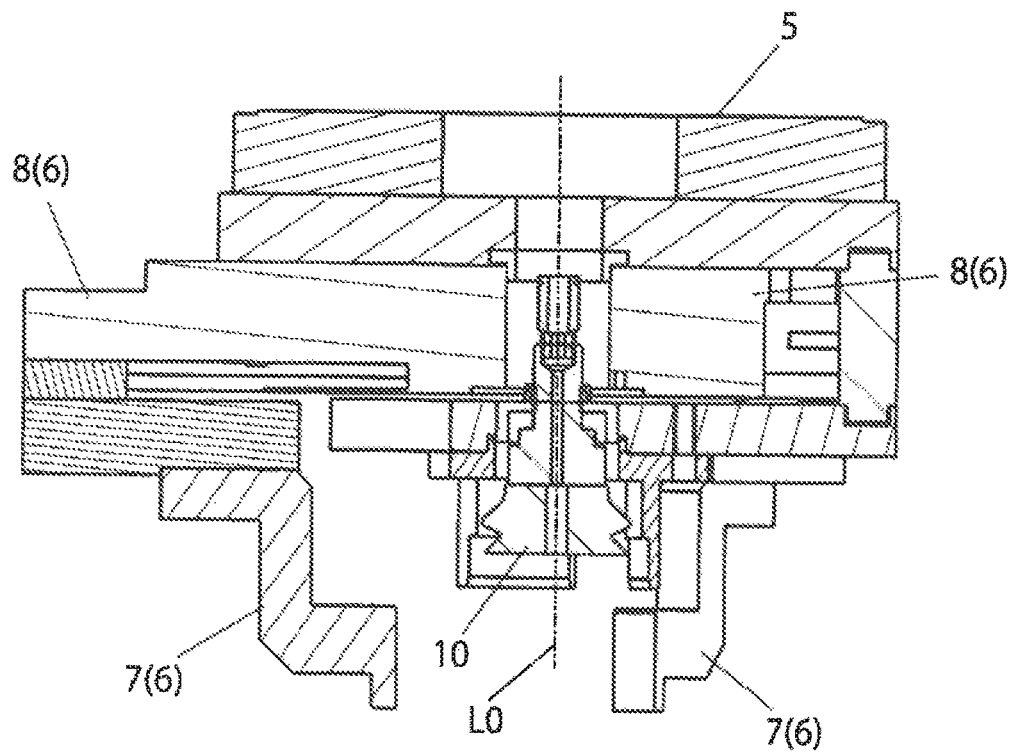
FIG. 5 is a longitudinal section view illustrating the end effector in FIG. 2 together with a first type of object to be handled (O ring guide jig).
Figure 5:
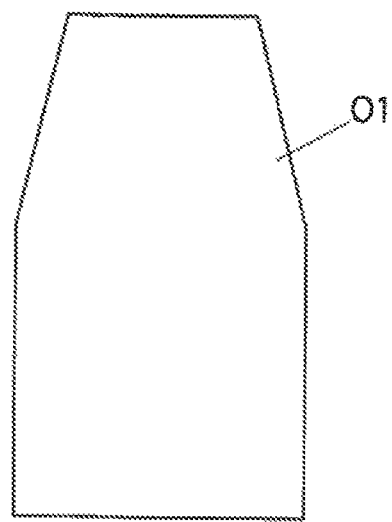

As illustrated in FIG. 5, when holding a first type of object to be handled O1 by the first object holding mechanism 6, each of the first gripping members 7 is positioned outside in the radial direction by the gripping member drive unit 8 and the robot arm 2 is driven so as to position the three first gripping members 7 around a side peripheral surface of the first type of object to be handled O1.

In the state, each of the first gripping members 7 is moved inside in the radial direction so that the side peripheral surface of the first type of object to be handled O1 is gripped by each of the first gripping members 7 from three directions. Subsequently, the robot arm 2 is driven so as to transfer the first type of object to be handled O1 to a predetermined transfer destination and each of the first gripping members 7 is moved outside in the radial direction by the gripping member drive unit 8 so as to release the grip of the first type of object to be handled O1.

Figure 6:
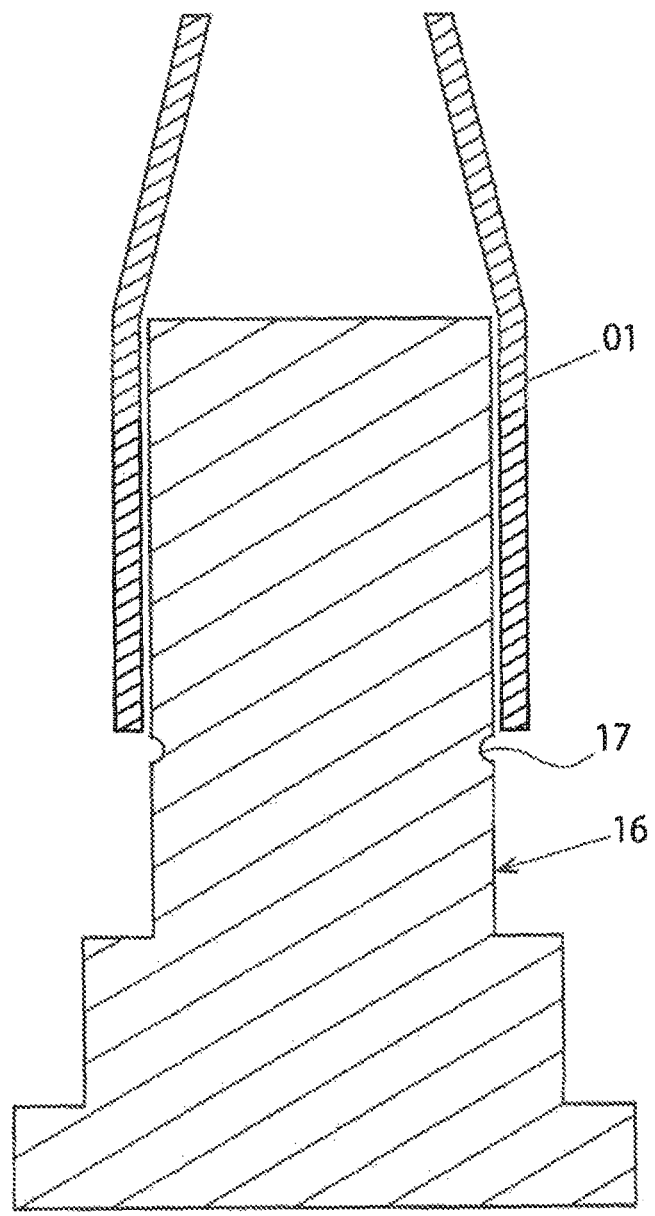
FIG. 6 is a longitudinal section view illustrating a state that the first type of object to be handled (O ring guide jig) is fitted to an assembly component to which the O ring is to be mounted.

At the transfer destination of the first type of object to be handled O1, an assembly component 16 to which an O ring (second type of object to be handled) should be mounted is placed on a work table, as illustrated in FIG. 6. By the above-mentioned operation of the robot arm 2 and the end effector 4, the first type of object to be handled O1 is fitted to the assembly component 16 from above. Namely, the first type of object to be handled O1 is formed of a cylindrical member having a tapered upper end portion, and it is fitted to the assembly component 16 via its lower end opening from above. An O ring mounting groove 17 is formed in a side peripheral surface of the assembly component 16.

In this example, the first type of object to be handled O1 functions as an O ring guide jig for guiding the O ring up to the O ring mounting groove 17 when fitting the O ring to the O ring mounting groove 17 of the assembly component 16.

Figure 7:
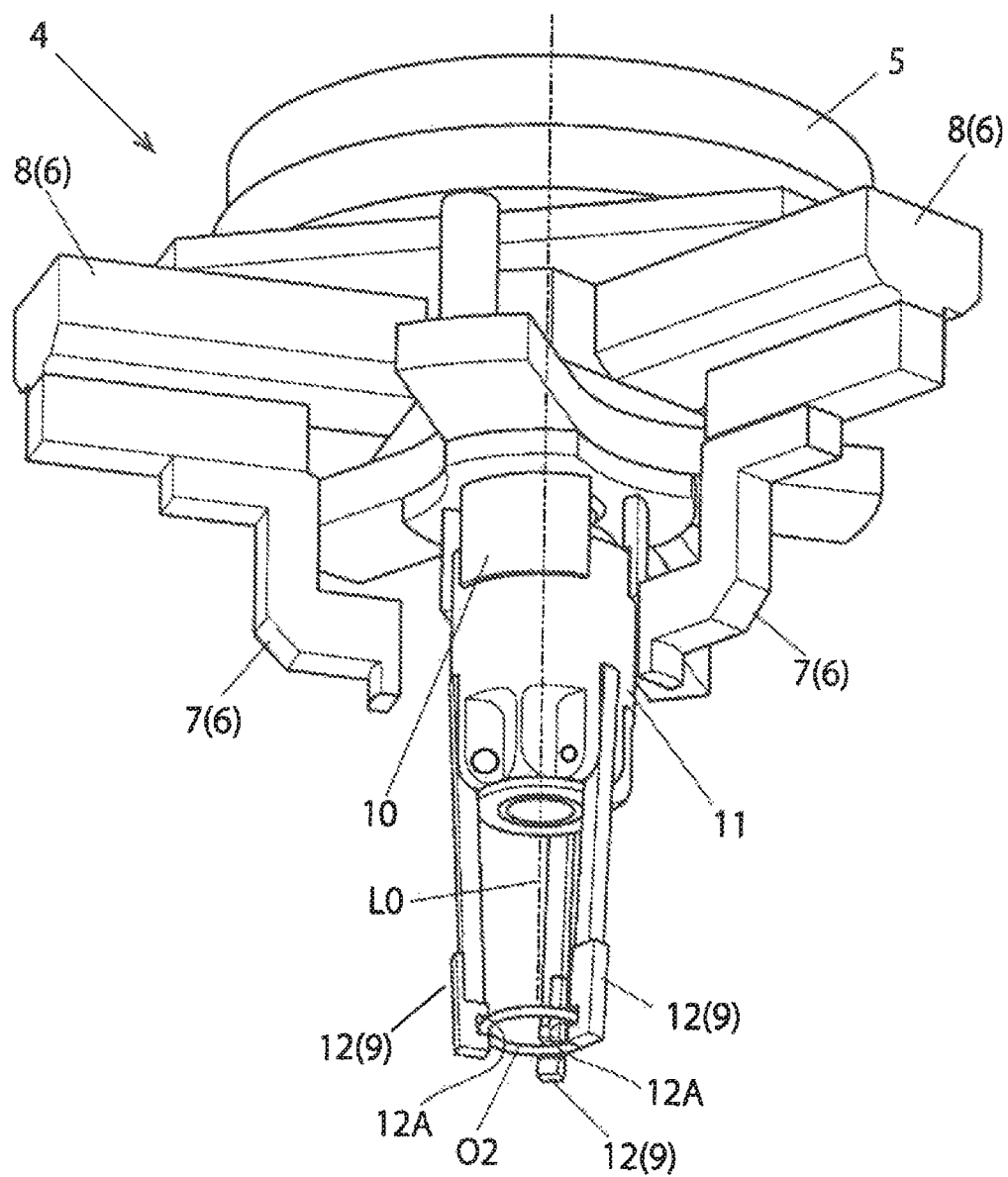
FIG. 7 is a perspective view illustrating a state that a second object holding unit is mounted to the end effector in FIG. 2 in a state that a second type of object to be handled (O ring) is held.
Figure 8:
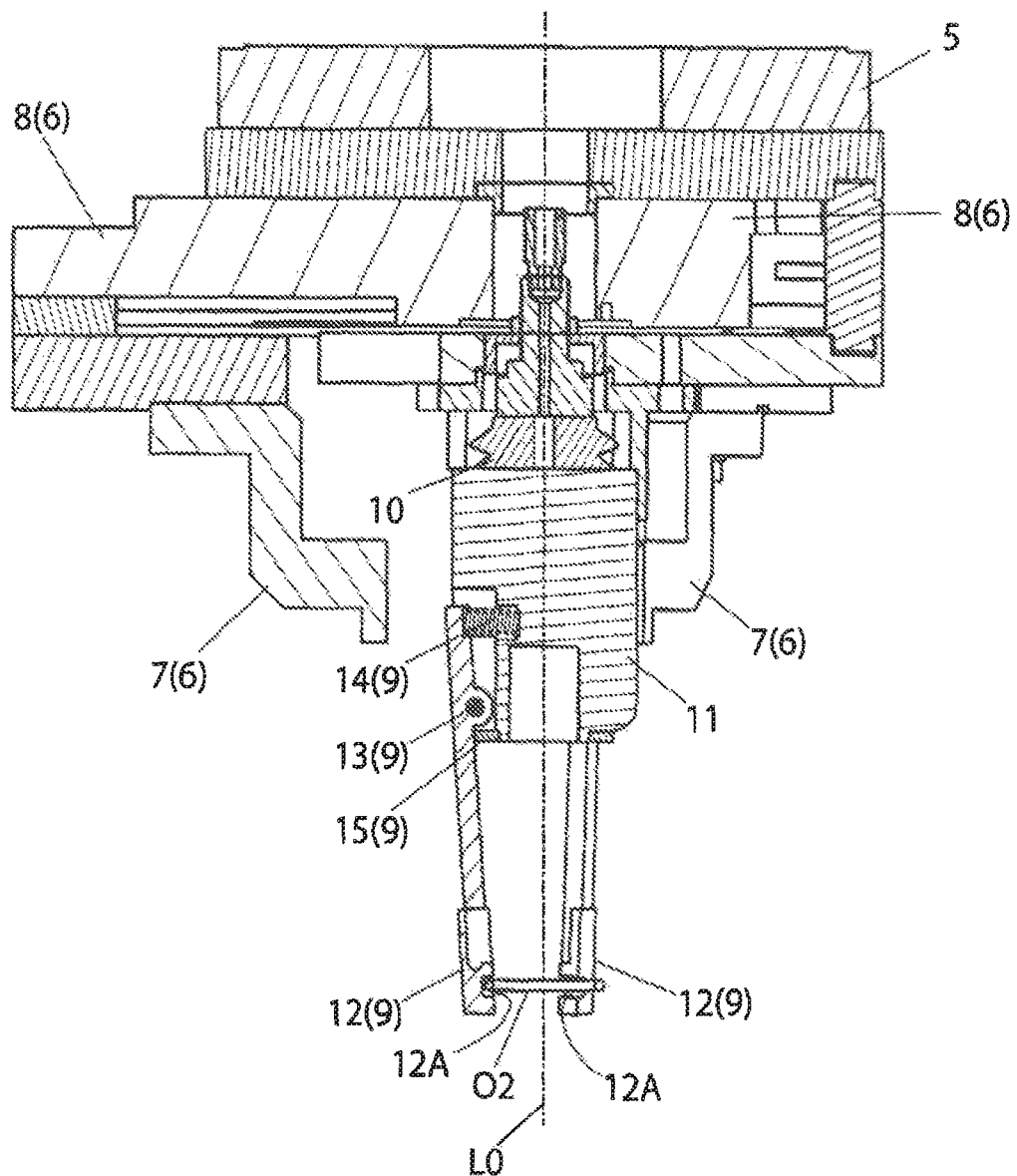
FIG. 8 is a longitudinal section view illustrating the end effector in FIG. 7 in a state that the second type of object to be handled (O ring) is held.

As illustrated in FIG. 7 and FIG. 8, a unit holding mechanism 10 for releasably holding a second object holding unit (elastic member holding unit) 9 is provided at the center portion of the end effector base portion 5. The second object holding unit 9 is a unit for holding the second type of object to be handled O2. In this example, the unit holding mechanism 10 holds the second object holding unit 9 by adsorption.

Note that a mechanism for the unit holding mechanism 10 to hold the second object holding unit 9 is not limited to adsorption and may be grip by a gripping member. That is, any mechanism may be employed as long as it can releasably fix the second object holding unit 9 to the end effector base portion 5.

Note that, in this embodiment, the second type of object to be handled O2 is smaller in diameter in its part to be held than the first type of object to be handled O1, and therefore the second type of object to be handled O2 cannot be held by the first gripping member 7 of the first object holding mechanism 6.

Namely, in the end effector of this embodiment, even an object to be handled having a too small diameter to be held by the first object holding mechanism 6 can be held by the second object holding unit 9 which is held by the unit holding mechanism 10.

Note that the second type of object to be held O2 in this embodiment is an O ring.

The second object holding unit 9 has a unit body 11 which is adsorbed and held by the unit holding mechanism 10 and a plurality of second gripping members (elastic component gripping members) 12 for gripping the second type of object to be handled O2. In this embodiment, three second gripping members 12 are arranged at equal angular intervals (120°) around a center axis L0 of the end effector 5. A recessed portion 12A into which the O ring as the second type of object to be held O2 is fitted is formed at a lower end portion (distal end portion) of each of the second gripping members 12.

As illustrated in FIG. 8, each of the second gripping members 12 is swingably supported by a pivot pin 13 relative to the unit body 11 and also energized in a direction of gripping the second type of object to be handled O2 (object gripping direction) by a compression spring (biasing unit) 14. Swinging motion of the second gripping member 12 in the object gripping direction is restricted by each stopper member 15 provided inside in the radial direction with respect to each of the second gripping members 12.

The end effector 5 according to this embodiment is configured so that the second object holding unit 9 held by the unit holding mechanism 10 is driven by the first object holding mechanism 6. More specifically, it is configured so that the second gripping member 12 of the second object holding unit 9 held by the unit holding mechanism 10 is driven by the first gripping member 7 of the first object holding mechanism 6.

Figure 9:
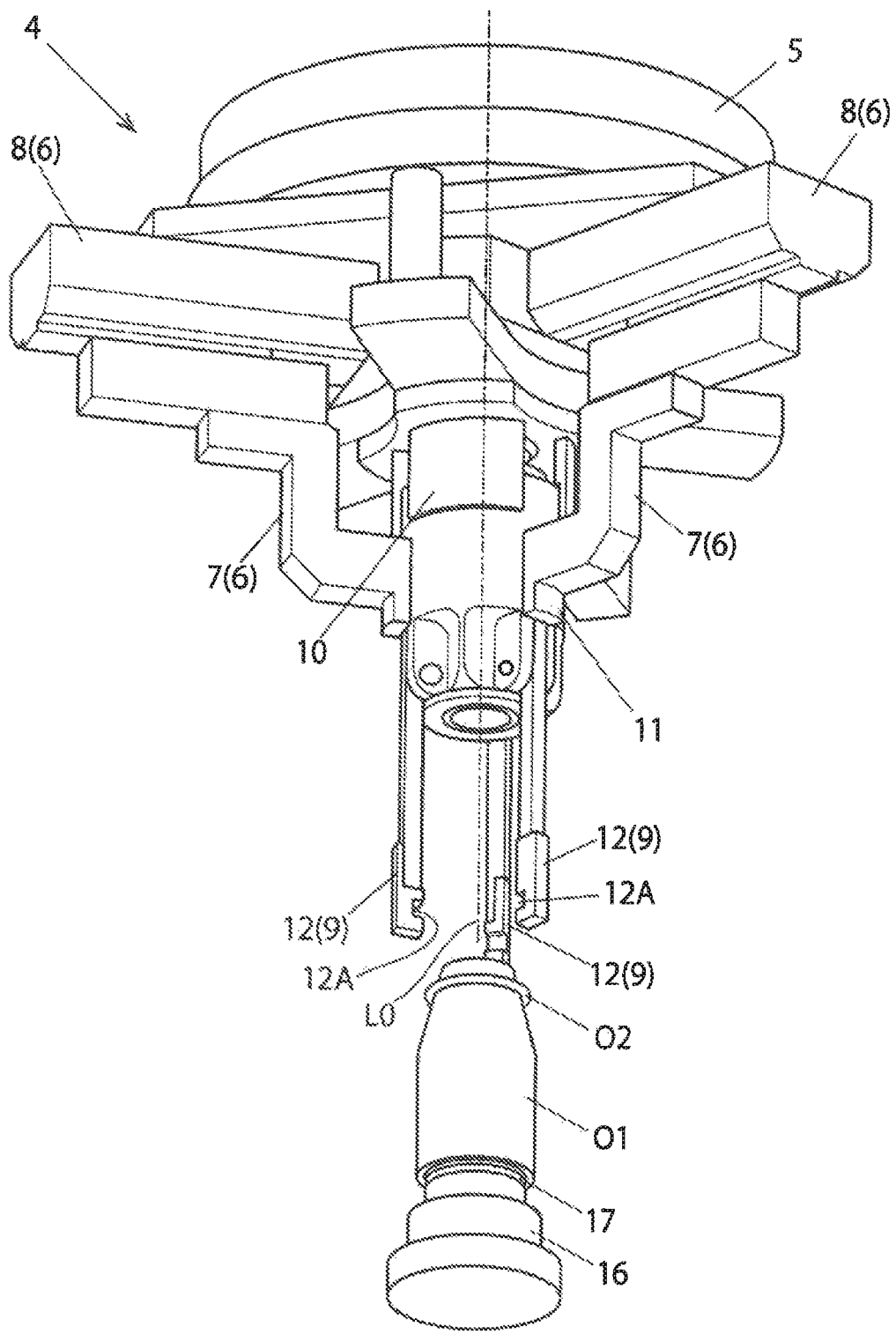
FIG. 9 is a perspective view illustrating a state that the second object holding unit of the end effector in FIG. 7 is driven and the second type of object to be handled (O ring) is released.

Specifically, when the first gripping member 7 of the first object holding mechanism 6 is moved inside in the radial direction from the state illustrated in FIG. 7 and FIG. 8, the upper end portion of the second gripping member 12 of the second object holding unit 9 is pushed in by a claw portion of the distal end of the first gripping member 6 against the biasing force of the compression spring 14, as illustrated in FIG. 9. Thereby, a lower end portion of each of the second gripping members 12 is driven in a direction that the second type of object to be handled O2 is released.

When holding the second type of object to be handled O2 by the second object holding unit 9 held by the unit holding mechanism 10, each of the second gripping members 12 is driven by each of the first gripping members 7 against the biasing force of each compression spring 14 so as to move each of the second gripping members 12 to a releasing position. In this state, the robot arm 2 is driven so as to position the three second gripping members 12 around the second type of object to be handled O2.

In this state, each of the first gripping members 7 is moved outside in the radial direction so as to move each of the second gripping members 12 in the object gripping direction by the biasing force of each compression spring 14. Thereby, the second type of object to be handled O2 is gripped by each of the second gripping members 12 from three directions.

Subsequently, the robot arm 2 is driven so as to transfer the second type of object to be handled (O ring) O2 to above the O ring guide jig as the first type of object to be handled O1 (transfer step). Subsequently, each of the first gripping members 7 is moved inside in the radial direction so as to move each of the second gripping members 12 in the object releasing direction, thereby releasing the grip of the second type of object to be handled O2.

Since an upper end diameter of the tapered upper end portion of the O ring guide jig O1 is set smaller than an inner diameter of the O ring O2, the O ring O2 released from the second gripping member 12 fits to the tapered upper end portion of the O ring guide jig O1 (fitting step).

Next, a work for fitting the O ring O2 which is fitted to the tapered upper end portion of the O ring guide jig O1 into the O ring mounting groove 17 of the assembly component 16 will be described.

The first gripping member 7 moved inside in the radial direction for releasing the O ring O2 from the second gripping member 12 is moved outside in the radial direction again so as to release the pressing force from the first gripping member 7 against the upper end of the second gripping member 12. Then, the upper end portion of the second gripping member 12 is pressed outside in the radial direction by the biasing force of the compression spring 14 and the lower end portion of the second gripping member 12 is moved inside in the radial direction (refer to FIG. 8).

Figure 10:
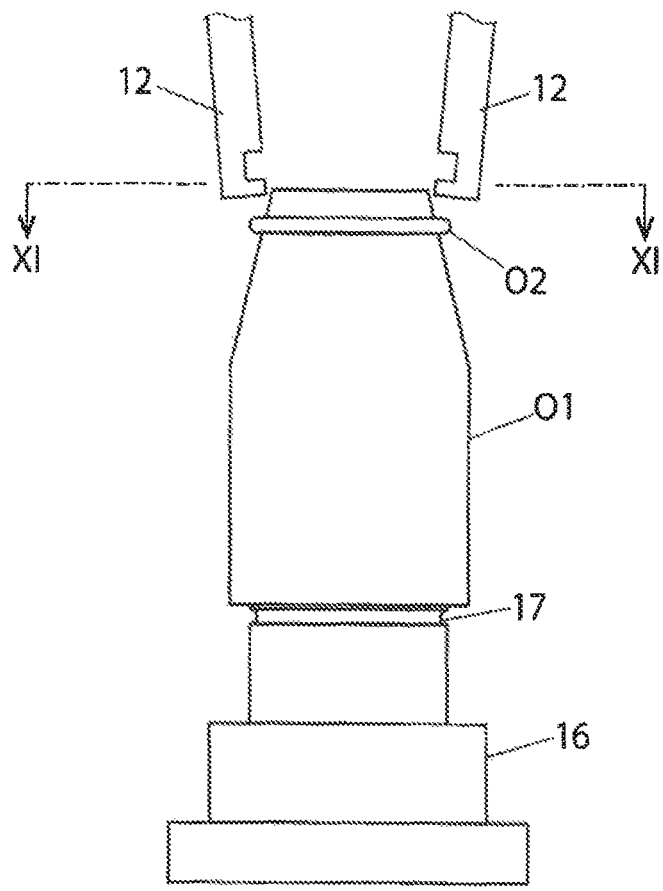
FIG. 10 is a front view illustrating a state that the O ring is fitted to an upper end portion of the O ring guide jig.
Figure 11:
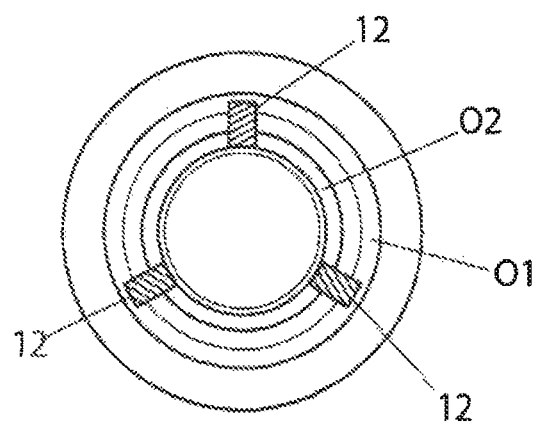
FIG. 11 is a view taken in the direction of an arrow XI-XI in FIG. 10.

As illustrated in FIG. 10 and FIG. 11, the lower end portion of the second gripping member 12 moved inside in the radial direction is positioned outer side than an upper end peripheral edge of the tapered upper end portion of the O ring guide jig O1.

Figure 12A:
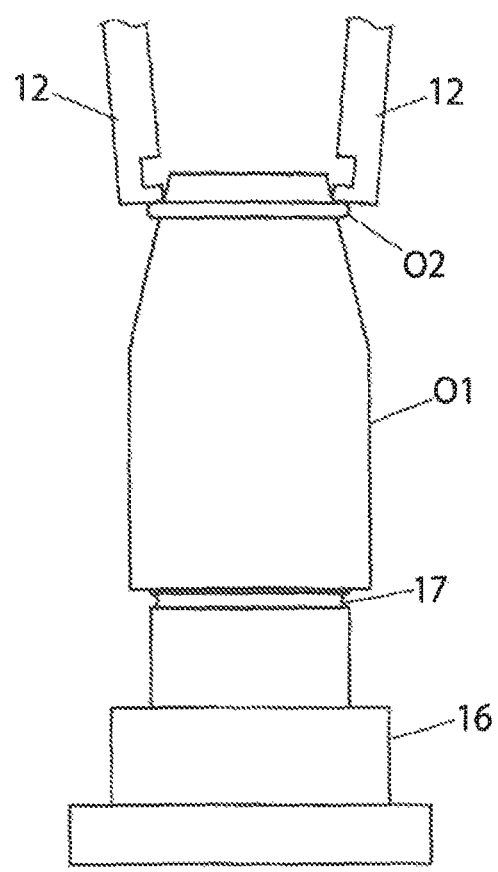
FIG. 12A is a front view illustrating a work process when fitting the O ring into the O ring mounting groove of the assembly component by a second gripping member of the second object holding unit.

From the state illustrated in FIG. 10 and FIG. 11, the robot arm 2 is driven so as to move the end effector 4 downward. Consequently, as illustrated in FIG. 12A, the lower end portion of the second gripping member 12 abuts on the outer surface of the tapered upper end portion of the O ring guide jig O1 and slides on the tapered surface while pressed and displaced outside in the radial direction. Namely, the lower end portion of the second gripping member 12 lowers along the outer surface of the tapered upper end portion of the O ring guide jig O1 while displaced from a gripping position toward a releasing position against the repulsive force of the compression spring 14. Here, the gripping position unit a position of the lower end portion of the second gripping member 12 in the state of gripping the O ring O2 and the releasing position unit a position of the lower end portion of the second gripping member 12 in the state of releasing the O ring O2.

Figure 12B:
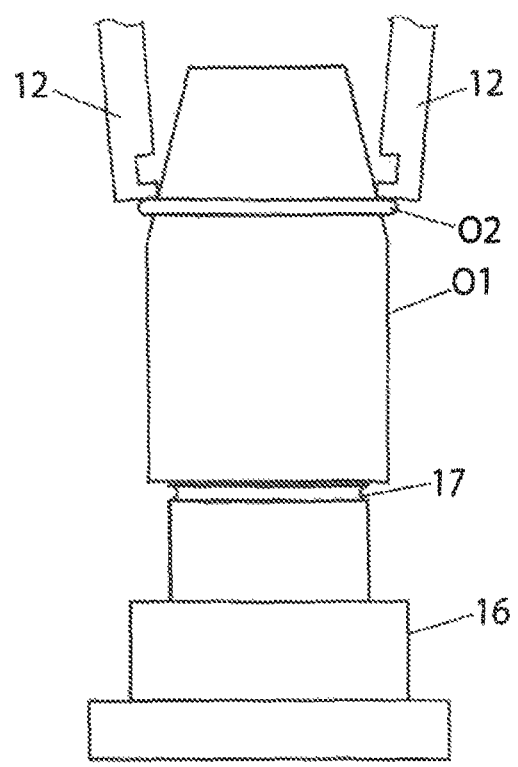
FIG. 12B is another front view illustrating the work process when fitting the O ring into the O ring mounting groove of the assembly component by the second gripping member of the second object holding unit.
Figure 12:
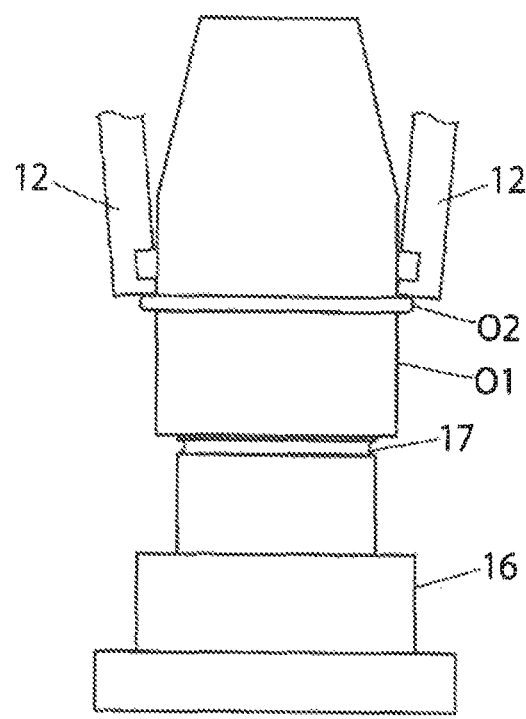
FIG. 12C is another front view illustrating the work process when fitting the O ring into the O ring mounting groove of the assembly component by the second gripping member of the second object holding unit.
FIG. 12D is another front view illustrating the work process when fitting the O ring into the O ring mounting groove of the assembly component by the second gripping member of the second object holding unit.
Figure 12:
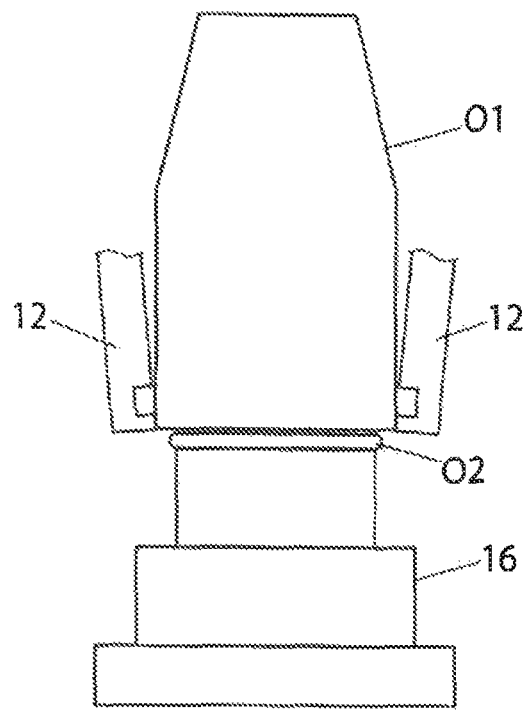

Since the O ring O2 is previously fitted to the tapered upper end portion of the O ring guide jig O1 using the robot arm 2 and the end effector 4, the lower end portion of the second gripping member 12 which lowers while sliding on the tapered surface abuts on the O ring O2, as illustrated in FIG. 12B. Accordingly, the O ring O2 is pressed down along the tapered surface of the O ring guide jig O1 by the lower end portion of the lowering second gripping member 12 (pressing down step). Namely, the O ring O2 lowers sliding on the tapered surface of the upper end portion of the O ring guide jig O1 while enlarging its diameter due to its elasticity.

The O ring O2 which lowers together with the second gripping member 12 passes the tapered upper end portion of the O ring guide jig O1 and lowers sliding on the straight part of the O ring guide jig O1, as illustrated in FIG. 12C.

Then, as illustrated in FIG. 12D, the O ring O2 passed the lower end portion of the straight part of the O ring guide jig O1 contracts its diameter which has been enlarged by the O ring guide jig O1 by its elasticity. The O ring groove 17 which is formed on the side peripheral surface of the assembly component 16 is located in a position corresponding to the lower end portion of the straight part of the O ring guide jig O1. Accordingly, the O ring O2 which is released from the O ring guide jig O1 and contracts its diameter fits into the O ring groove 17 formed on the side peripheral surface of the assembly component 16.

After finishing the fitting work of the O ring O2 into the O ring groove of the assembly component 16, the first gripping member 7 is moved inside in the radial direction again so as to press in the upper end portion of the second gripping member 12, thereby displacing its lower end portion outside in the radial direction. In this state, the robot arm 2 is driven so as to raise the end effector 4 and move the end effector 4 to a predetermined location.

Then, the first gripping member 7 is moved outside in the radial direction again so that it retreats from the upper end portion of the second gripping member 12 and also the unit holding mechanism 10 is operated so as to release the holding state of the second object holding unit 9, thereby removing the second object holding unit 9 from the end effector 4.

In the state that the second object holding unit 9 is removed from the end effector 4, the robot arm 2 is driven so as to move the end effector 4 above the O ring guide jig O1. Subsequently, the O ring guide jig O1 is gripped by the first gripping member 7 and pulled upward so as to be removed from the assembly component 16 and transferred to and placed in a predetermined location.

According to the above-mentioned series of steps, the fitting work of the O ring O2 into the O ring mounting groove 17 of the assembly component 16 is finished.

Note that, although the unit holding mechanism 10 is used for holding the second object holding unit 9 as mentioned above, it also can be used for holding a third type of object to be handled. The robot arm 2 is driven in a state that the third type of object to be handled is held by the unit holding mechanism 10 so as to transfer the third type of object to be handled to a predetermined location.

As stated above, according to this embodiment, the second object holding unit 9 can be used when holding the O ring O2 and transferring it up to the O ring guide jig O1 and also it can be used when pressing down the O ring O2 along the outer surface of the O ring guide jig O1 so as to move it up to the guide groove 17 of the assembly component 16. Therefore, the fitting work of the O ring O2 into the O ring mounting groove 17 can be performed in a short time in a few work processes by a simple configuration.

Additionally, according to this embodiment, the first object holding mechanism 6 and the unit holding mechanism 10 are provided to the end effector base portion 5, and also the second gripping member 12 of the second object holding unit 9 held by the unit holding mechanism 10 is driven by the first gripping member 7 of the first object holding mechanism 6. Therefore, it can considerably enlarge a range of kinds and sizes of objects which can be handled while suppressing increase of manufacturing cost of the industrial robot 1, decline in credibility accompanying complication of the configuration, and increase in space for installing exchanged hands.

Additionally, the unit holding mechanism 10 for holding the second object holding unit 9 can be used for holding an object to be handled, and therefore the range of kinds and sizes of objects which can be handled can be further enlarged.

Note that, although the case when the second type of object to be handled is the O ring was described in the above-stated example, the second type of object to be handled in the present invention is not limited to the O ring, and annular or c-shaped components having elasticity such as an oil seal and a snap ring will be handled widely.

Additionally, although the second object holding unit (elastic component holding unit) 9 is detachable relative to the end effector base portion 5 in the above-stated example, this is not necessarily essential in the present invention and the elastic component holding unit also can be fixedly provided to the end effector base portion.

Additionally, although the case when the O ring O2 is fitted into the O ring mounting groove of the assembly component 16 via the O ring guide jig O1 was described in the above-stated example, this is not necessarily essential in the present invention and also an elastic component such as the O ring can be fitted using a tapered shape of the assembly component itself, for example.

DESCRIPTION OF REFERENCE NUMERALS

1 . . . industrial robot
2 . . . robot arm

3 . . . wrist shaft
4 . . . end effector (hand)
5 . . . end effector base portion
6 . . . first object holding mechanism (object holding unit)
7 . . . first gripping member (object gripping member)
8 . . . gripping member drive unit
9 . . . second object holding unit (elastic component holding unit)
10 . . . unit holding mechanism
11 . . . unit body
12 . . . second gripping member (elastic component gripping member)
12A . . . recessed portion of second gripping member
13 . . . pivot support pin
14 . . . compression spring (biasing unit)
15 . . . stopper member
16 . . . assembly component
17 . . . O ring mounting groove of assembly component
O1 . . . first type of object to be handled (O ring guide jig)
O2 . . . second type of object to be handled (O ring)

The invention claimed is:

1. An end effector mounted to a robot arm, comprising:
an end effector base portion connected to the robot arm;
an elastic component holding unit provided to the end effector base portion so as to hold an elastic component;
an object holding unit provided to the end effector base portion so as to hold an object to be handled; and
a holding mechanism provided to the end effector base portion so as to releasably hold the elastic component holding unit,
wherein the elastic component holding unit has a plurality of elastic component gripping members that releasably grip the elastic component; and a biasing unit configured to repulsively bias each distal end portion of the plurality of elastic component gripping members from a releasing position for releasing the elastic component toward a gripping position for gripping the elastic component.

2. The end effector according to claim 1, wherein the elastic component holding unit held by the holding mechanism is configured to be driven by the object holding unit.

3. The end effector according to claim 2,
wherein the object holding unit has an object gripping member configured to grip the object to be handled, and
wherein the elastic component holding unit held by the holding mechanism is configured to be driven by the object gripping member.

4. The end effector according to claim 3, wherein the elastic component gripping member of the elastic component holding unit held by the holding mechanism is configured to be driven by the object gripping member.

5. The end effector according to claim 4, wherein the elastic component gripping member is configured to be driven by the object gripping member against a biasing force of the biasing unit in a direction that the elastic component is released.

6. The end effector according to claim 1,
wherein the holding mechanism is provided in a center portion of the end effector base portion, and
wherein the object holding unit is provided in a periphery of the holding mechanism.

7. The end effector according to claim 1, wherein distal end portions of the plurality of elastic component gripping members lower along an outer surface of a tapered part of an object to which the elastic component is fitted while being displaced from the gripping position toward the releasing position against a repulsive force of the biasing unit.

8. The end effector according to claim 1,
wherein the elastic component gripping member has an elongated swinging member which is swingably provided to the end effector base portion, and
wherein distal end portions of the plurality of elongated swinging members grip the elastic component.

9. The end effector according to claim 1, wherein the each distal end portion of the plurality of elastic component gripping members in the gripping position has a part positioned inner side than an outer peripheral edge of the elastic component which is gripped.

10. The end effector according to claim 1, wherein the elastic component is an annular or C-shaped component having elasticity.

11. An industrial robot comprising:
the end effector according to claim 1; and
a robot arm to which the end effector is mounted.

12. An operation method of the industrial robot according to claim 11, comprising:
a transfer step in which the robot arm is driven so as to transfer the elastic component which is held by the elastic component holding unit;
a fitting step in which the elastic component holding unit is driven so that the elastic component which has been held by the elastic component holding unit is released and fitted to an object; and
a pressing down step in which the elastic component is pressed down along an outer surface of the object by distal end portions of the plurality of elastic component gripping members of the elastic component holding unit.

13. The operation method of the industrial robot according to claim 12, wherein, in the fitting step, the elastic component is fitted to a tapered part of the object, and wherein, in the pressing down step, the distal end portions of the plurality of elastic component gripping members lower along an outer surface of the tapered part of the object while being displaced from the gripping position toward the releasing position against a repulsive force of the biasing unit.

14. The operation method of the industrial robot according to claim 12, wherein the elastic component is an annular or c-shaped component having elasticity.

* * * * *